United States Patent [19]

Takahata et al.

[11] 4,075,429
[45] Feb. 21, 1978

[54] TRANSMULTIPLEXER

[75] Inventors: Fumio Takahata; Kazunori Inagaki; Yasuo Hirata, all of Tokyo, Japan

[73] Assignee: Kokusai Denshin Denwa Kabushiki Kaisha, Japan

[21] Appl. No.: 678,686

[22] Filed: Apr. 20, 1976

[30] Foreign Application Priority Data

Apr. 21, 1975 Japan .................................. 50-48509
May 6, 1975 Japan .................................. 50-54410

[51] Int. Cl.$^2$ ............................................. H04J 1/00
[52] U.S. Cl. ........................... 179/15 BM; 179/15 FS
[58] Field of Search ............ 179/15 R, 15 A, 15 BM, 179/15 FD, 15 FS

[56] References Cited

U.S. PATENT DOCUMENTS 3,328,528  6/1967  Darlington ..................... 179/15 BM

FOREIGN PATENT DOCUMENTS 905,838  9/1962  United Kingdom ........... 179/15 BM

OTHER PUBLICATIONS

IEEE Conference on Communications, Freeny et al., "An Exploratory Terminal for Translating Between Analog Frequency Division and Digital Time Division Signals", June 1971, pp. 22-31-22-36.

Primary Examiner—Kathleen H. Claffy
Assistant Examiner—Joseph A. Popek
Attorney, Agent, or Firm—Robert E. Burns; Emmanuel J. Lobato; Bruce L. Adams

[57] ABSTRACT

A transmultiplexer, in which after a pulse code modulated, time division multiplex signal of the voice band signal is converted into an analog signal, the analog signal is separated by filters into signals of respective channels and then the signals of the respective channels are combined together to provide a single sideband frequency divided, multiplex signal. In a reverse signal flow type, after a single sideband frequency-divided multiplex signal is separated by filters into signals of respective channels, the signals of respective channels are converted into digital signals and thereafter combined together to provide a pulse code modulated, time division multiplex signal. In accordance with this invention, a sign bit inverter is provided for reversing sign bits of predetermined specific channels in the pulse code modulated, time division multiplex signal every other frame.

4 Claims, 33 Drawing Figures

TRANSMULTIPLEXER

FIELD OF THE INVENTION

This invention relates to a transmultiplexer for converting a single sideband frequency divided multiplex signal (The "single sideband" and the "frequency divided multiplex" will hereinafter be referred to as SSB and FDM, respectively.) into a pulse code modulated, time division multiplex signal (The "pulse code modulation" and the "time division multiplex" will hereinafter be referred to as PCM and TDM, respectively.), or for converting visa versa.

BRIEF DESCRIPTION OF THE PRIOR ART

In general, the multiplexing method can be classified into the time division multiplex of PCM signals and the frequency division multiplex of SSB signals. Heretofore, the FDM method has mainly been employed. In recent years, however, the TDM method employing inexpensive PCM multiplex has been practically used. Accordingly, the both methods will be simultaneously used in the same communication system, so that mutual conversion of the TDM signal and the FDM signal from each other is required.

In a conventional system for converting the PCM·TDM signal into the SSB·FDM signal, the input PCM·TDM signal is applied to a digital-to-analog converter and converted thereby into the PAM·TDM signal and then separated by a channel separator into signals of respective channels. The frequency spectrum of each PAM signal after channel separation has double sideband components at every multiple of the sampling frequency (8KHz in each frame of 125µS) and extends over a wide range of frequency band. Thereafter, the voice band signals of the respective channels extracted by low-pass filters from these wide ranges of frequency band are respectively frequency shifted by frequency converters. Since each frequency-shifted signal has double sideband components, only a lower sideband component is extracted by a corresponding one of band-pass filters. The extracted signals of the respective channels are combined together by a combiner to provide an SSB-FDM signal, which is transmitted over a transmission line.

In a conventional system for converting the SSB-FDM signal into the PCM-TDM signal, the input SSB-FDM signal separated by a divider hybrid and then SSB signals of the respective channels are extracted by band-pass filters. These extracted signals are frequency-shifted by a frequency converter and then signals of only the voice frequency band are extracted by low-pass filters. Next, the signals of the respective channels are converted by analog-to-digital converters into PCM signals and then the PCM signals of the respective channels are combined together by a channel combiner to provide a PCM-TDM signal, which is transmitted over a transmission line.

As has been described above, since the conventional transmultiplexer is constructed so that the signal is processed in the voice frequency band, it is necessary to provide a number of low-pass filters and a number of frequency converters.

BRIEF SUMMARY OF THE INVENTION

An object of this invention is to provide a transmultiplexer, which employs a sign bit inverter for reversing the sign bit every other frame before digital-to-analog conversion of the input PCM-TDM signal and eliminates a number of band-pass filters and frequency converters which are indispensable to the prior art device as described above, thereby enabling economical conversion of the PCM-TDM signal into the SSB-FDM signal with a simple circuit construction.

Another object of this invention is to provide a transmultiplexer, which employs a sign bit inverter for inverting sign bits of predetermined specific channels every other frame with respect to the PCM-TDM signal produced by combining together the PCM signals and eliminates a number of low-pass filters and frequency converters which are indispensable to the prior art device, thereby enabling economical conversion of the SSB-FDM signal into the PCM-TDM signal with a simple circuit construction.

To attain the objects of this invention, a sign bit inverter is provided in the path of PCM-TDM signals for reversing the sign bits every other frame of the PCM-TDM signals.

BRIEF DESCRIPTION OF THE DRAWINGS

The construction and operation of this invention will be clearly understood from the following detailed description taken in conjunction with the accompanying drawings, in which.

DETAILED DESCRIPTION OF THE INVENTION

Figure 1:
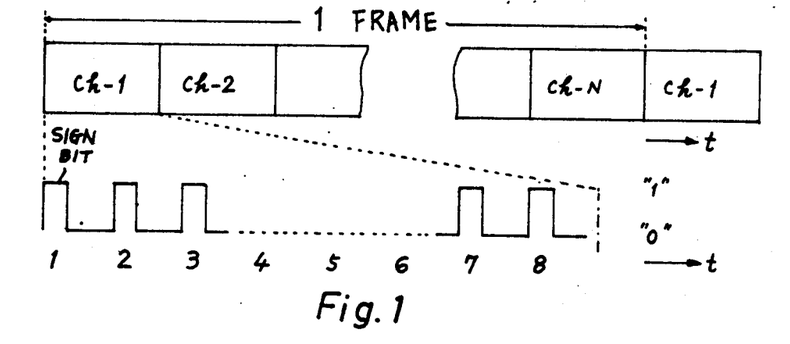
FIG. 1 shows time charts illustrating an example of the configuration of PCM-TDM signals.
Figure 2:
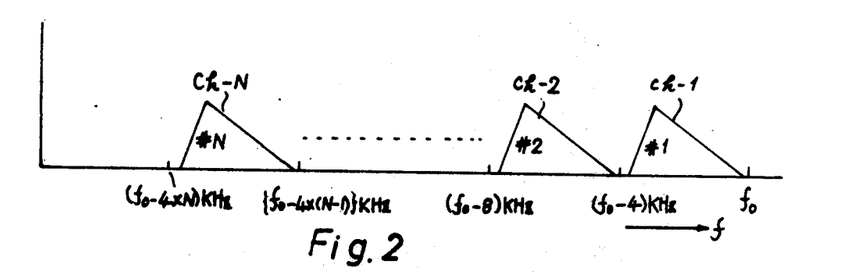
FIG. 2 is a frequency allocation chart illustrating an example of the configuration of SSB-FDM signals.

The mutual conversion herein mentioned implys that the PCM-TDM signal of FIG. 1 and the SSB-FDM signal of FIG. 2 are mutually converted, with their channel allocations having one to one correspondence to each other, and the FDM signal usually adopts such a regular channel allocation as shown in FIG. 2 in which the order of channels is not disturbed. Further, as shown in FIG. 1, a first bit of the PCM signal in one channel is a sign bit usually employed for the indication of the positive or negative polarity.

In an embodiment of this invention shown in FIG. 3, reference numeral 1 indicates a digital-to-analog converter for converting the PCM signal into a pulse amplitude modulated signal (The "pulse amplitude modulation" will hereinafter be referred to as PAM.); 2 designates a channel separator; 5-1 to 5-N represent N band-pass filters respectively corresponding to the output frequencies of the channel separator 2; and 6 shows a combiner hybrid.

Figure 3:
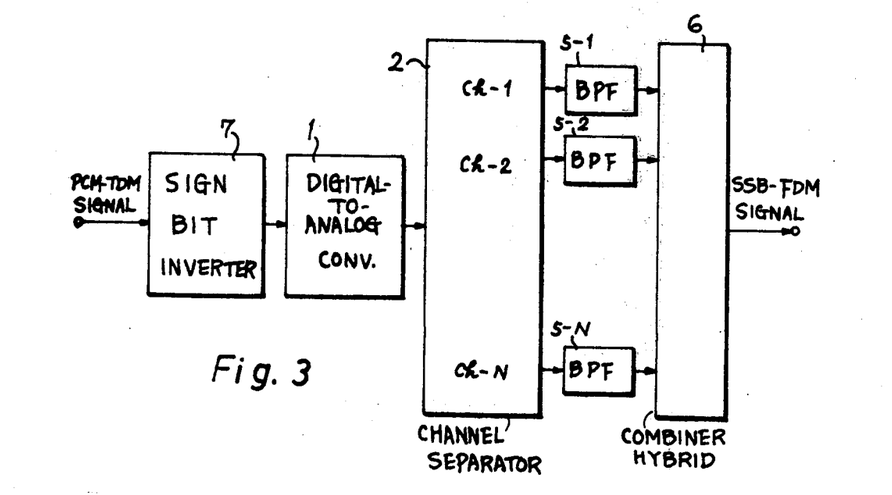
FIG. 3 is a block diagram illustrating an embodiment of this invention.

As is evident from FIG. 3, in this invention, the low-pass filters and the frequency converters required in the conventional art are removed but a sign bit inverter 7 is provided for reversing the sign bits of the PCM signals of predetermined channels (for example, odd or even channels) every other frame.

The operation of this embodiment will hereinbelow be described in detail. At first, such an input PCM-TDM signal as depicted in FIG. 1 is applied to the sign bit inverter 7 shown. The signal derived from the sign bit inverter 7 is applied to the digital-to-analog converter 1 to provide a PAM-TDM signal, which is thereafter separated into signals of respective channels by the channel separator 2.

Figure 5A:
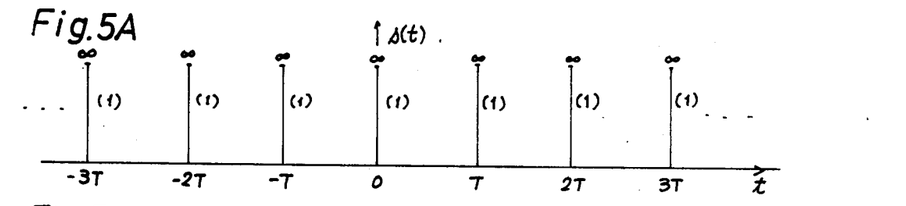
FIGS. 5A, 5B, 5C, 5D, 5E, 5F, 5G and 5H are time charts explanatory of the operation of the embodiment shown in FIG. 3.
Figure 5B:
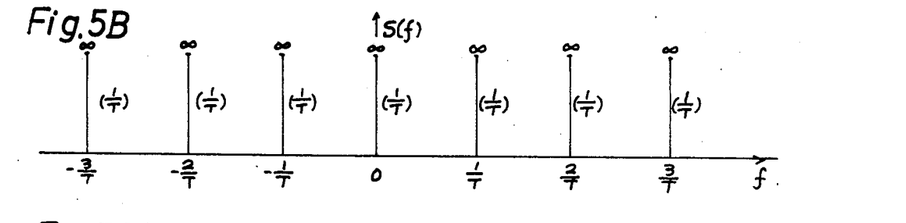
Figure 5C:
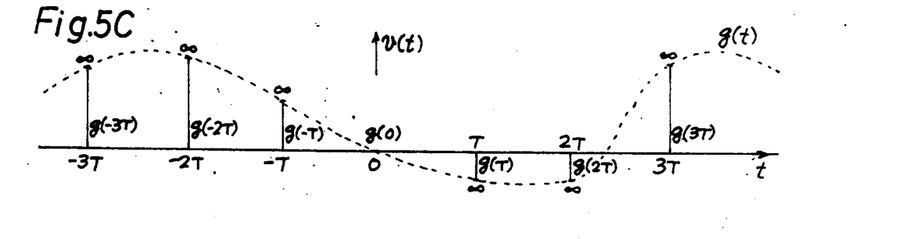
Figure 5D:
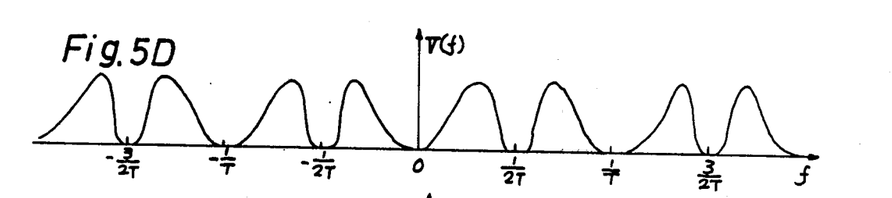

Now, the PAM signal separated for each channel will be described in detail. Namely, the sampling function $s(t)$ of a uniform impulse train having a period T (usually $T=125\mu S$ because of $125\mu S$/frame as described previously) such as shown in FIG. 5A is expressed by $$s(t) = \sum_{k=-\infty}^{\infty} \delta(t - kT),$$

where $k$ is an integer and $\delta$ is an impulse function. The frequency spectrum $S(f)$ of the sampling function $s(t)$ is $$S(f) = \frac{1}{T} \sum_{k=-\infty}^{\infty} \delta(f - \frac{k}{T})$$

as shown in FIG. 5B. Further, if the waveform function of the signal is taken as $g(t)$ and if the waveform function sampled by $s(t)$ is taken as $v(t)$, it follows that $$v(t) = g(t)s(t) = \sum_{k=-\infty}^{\infty} g(kT)\delta(t - kT)$$

as depicted in FIG. 5C. The frequency spectrum $V(f)$ of $v(t)$ is given by $$V(f) = G(f) \otimes S(f) = \frac{1}{T} \sum_{k=-\infty}^{\infty} G(f - \frac{k}{T}),$$

using the frequency spectrum $G(f)$ of $g(t)$, as shown in FIG. 5D, where $\otimes$ indicates the convolution.

Figure 4:
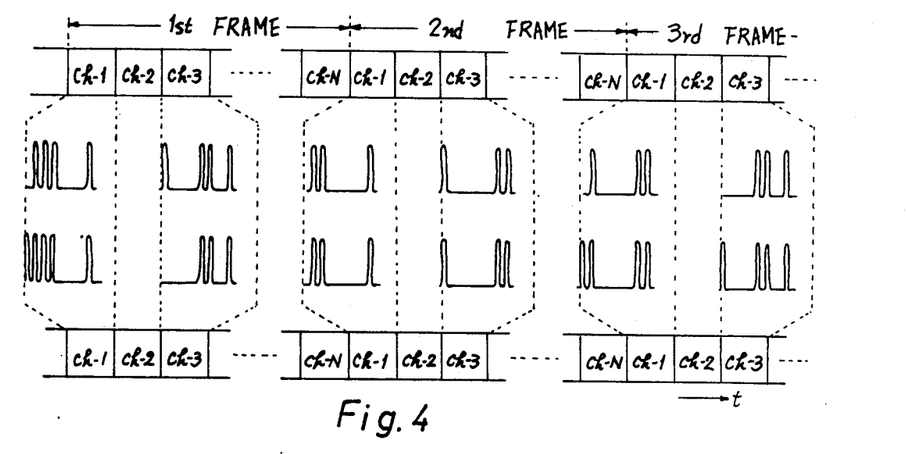
FIG. 4 shows time charts explanatory of the operation of this invention.
Figure 5E:
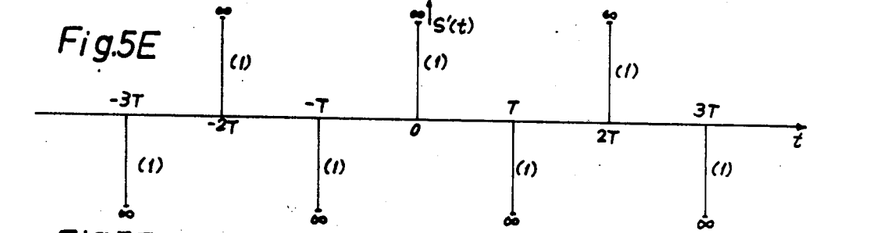
Figure 5F:
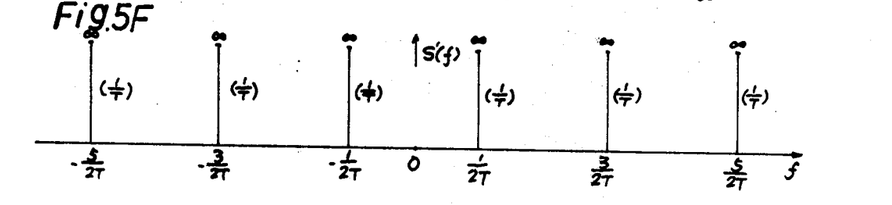
Figure 5G:
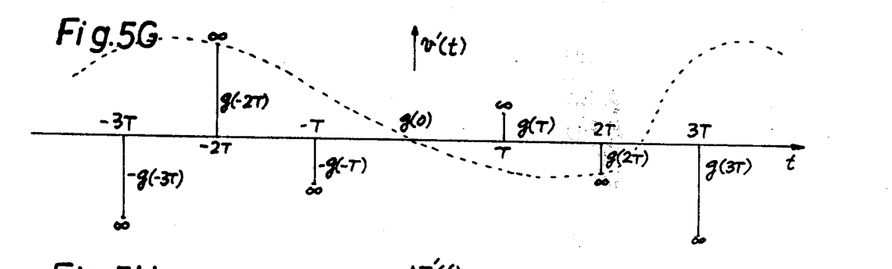
Figure 5H:
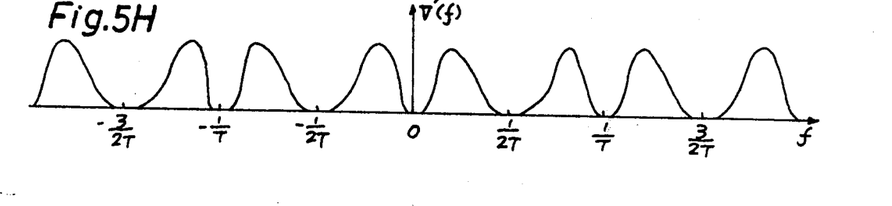

Since the abovementioned reversal of the sign bits every other frame is equivalent to the selection of the sampling function such as shown in FIG. 5E, its waveform function $s'(t)$ and frequency spectrum $S'(f)$ respectively become as follows:

$$s'(t) = \sum_{k=-\infty}^{\infty} \delta(t - kT)e^{j\pi k}$$

$$S'(f) = \frac{1}{T} \sum_{k=-\infty}^{\infty} \delta(f - \frac{k + \frac{1}{2}}{T})$$

as depicted in FIGS. 5E and 5F. Using the waveform function $s'(t)$, a sampled waveform function $v'(t)$ and its frequency spectrum $V'(f)$ are respectively given by $$v'(t) = g(t)s'(t) = \sum_{k=-\infty}^{\infty} g(kT)\delta(t - kT)e^{j\pi k}$$

$$V'(f) = G(f) \otimes S'(f) = \frac{1}{T} \sum_{k=-\infty}^{\infty} G(f - \frac{K + \frac{1}{2}}{T})$$

as shown in FIGS. 5G and 5H. Accordingly, the reversal of the sign bits every other frame such as depicted in FIG. 4 leads to changing the frequency allocation of FIG. 5D to that of FIG. 5H.

Figure 6A:
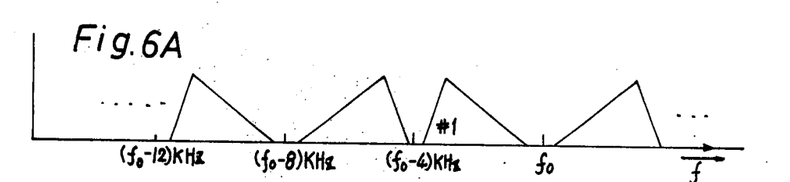
FIGS. 6A, 6B and 6C are frequency allocation charts explanatory of the operation of the embodiment shown in FIG. 3.
Figure 6B:
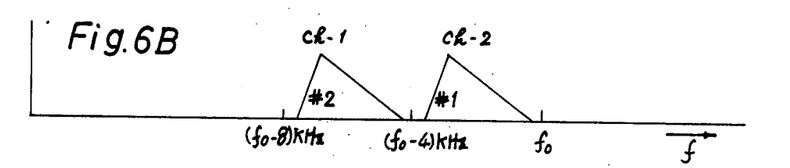
Figure 6C:
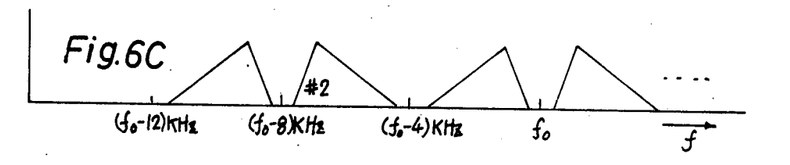

Turning back to FIG. 3, the signals of only desired frequency bands are extracted by the band-pass filters 5-1 to 5-N from such PAM signals of the respective channels and the signals of the respective channels are simply combined together by the combiner hybrid 6 (e.g. a hybrid transformer) to produce an SSB-FDM signal of such a regular channel allocation as shown in FIG. 2, which is transmitted over a transmission line. FIGS. 6A to 6C illustrate the frequency spectrums of the signals of only channels 1 and 2 before and after the band-pass filters 5-1 to 5-N and the combiner hybrid 6. That is, the PAM signal of the channel 1, with the sign bit inverted, is shown in FIG. 6A. In FIG. 6C is shown the PAM signal of the channel 2. By the band-pass filters 5-1 and 5-2, signals $f_0$ KHz to $f_0$-4) KHz and $(f_0$-4) KHz to $(f_0$-8) KHz are respectively extracted and combined together to obtain the composite signal of FIG. 6B.

Figure 7:
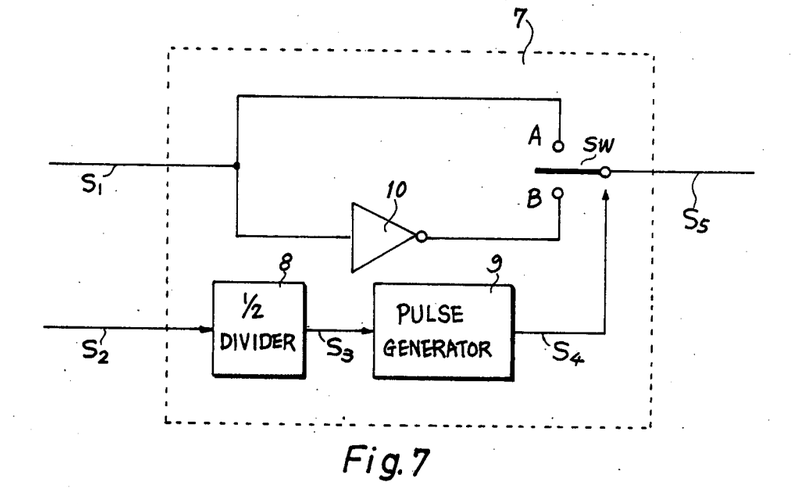
FIG. 7 is a block diagram illustrating an example of a sign bit inverter employed in the embodiment shown in FIG. 3.
Figure 8A:
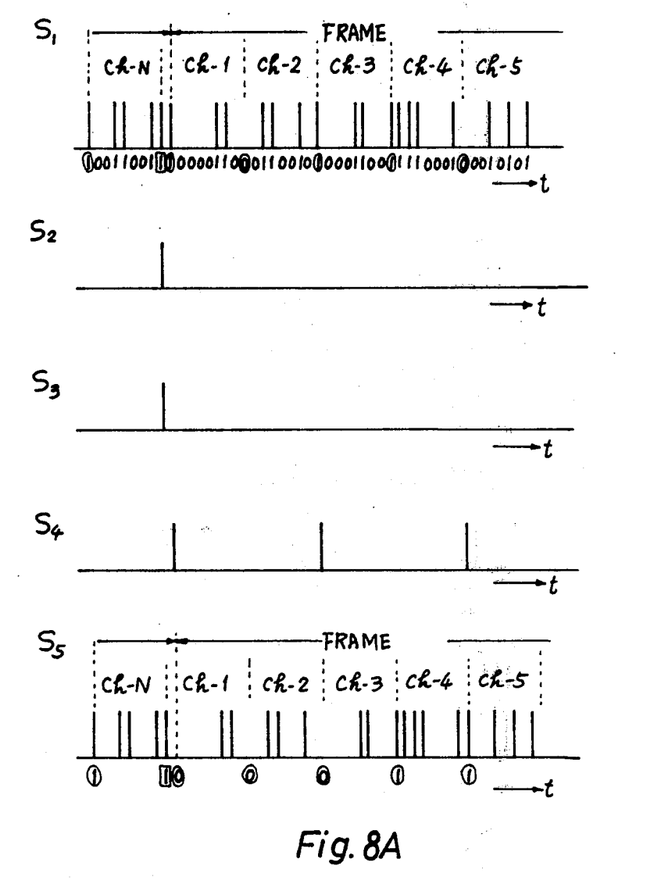
FIGS. 8A, 8B, 8C and 8D are time charts explanatory of the operation of the sign bit inverter employed in this invention.
Figure 8B:
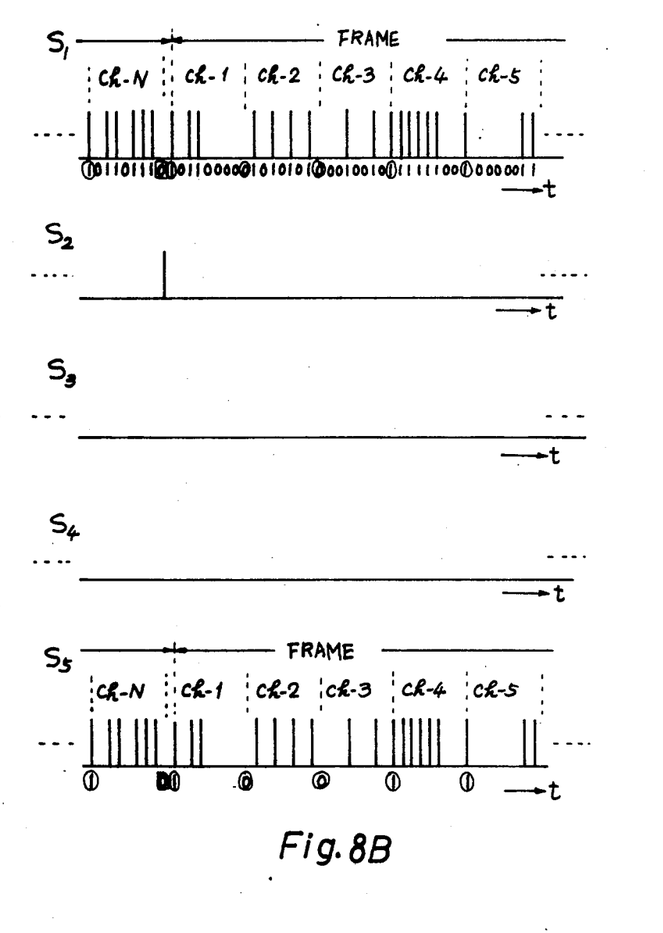
Figure 8C:
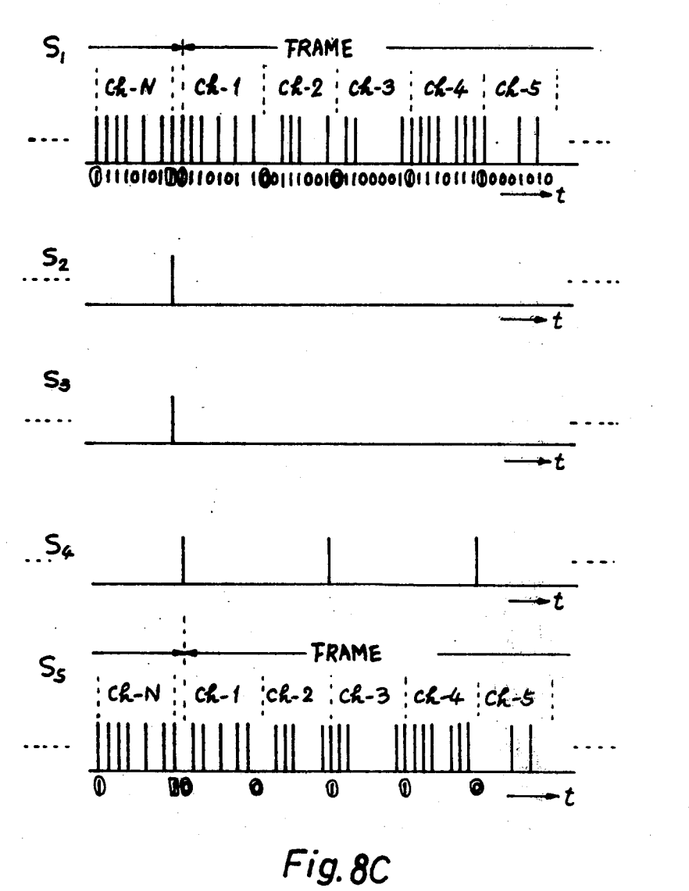
Figure 8D:
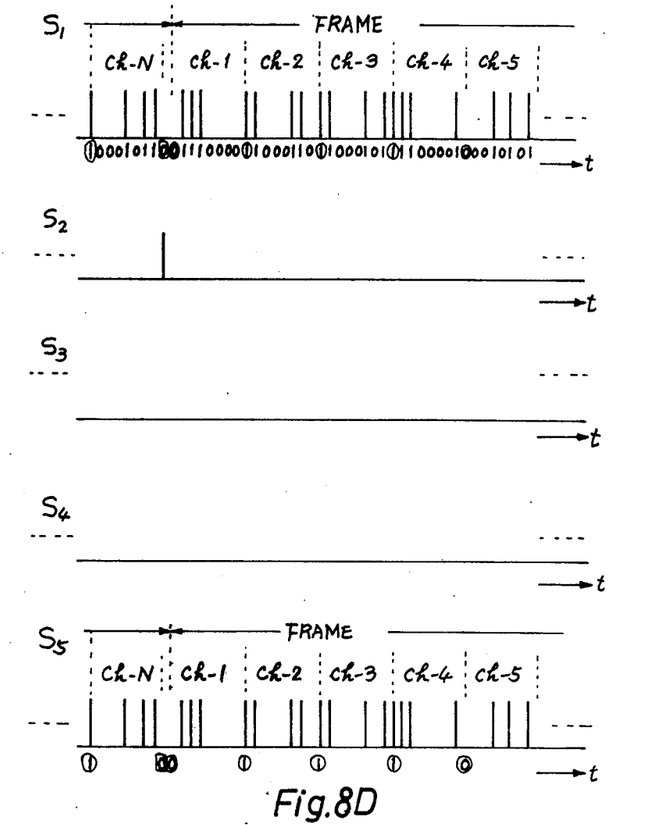
Figure 9:
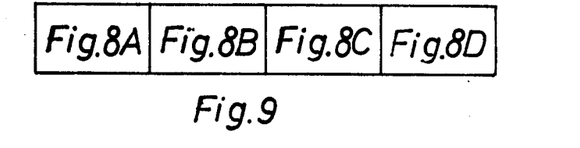
FIG. 9 is a diagram illustrating mutual connection relationship of FIGS. 8A, 8B, 8C and 8D.

Referring next to FIGS. 7 and 8A to 8D, a circuit construction of the sign bit inverter circuit 7 in FIG. 3 will be described. FIG. 7 illustrates one example of the construction of the sign bit inverter 7. In FIG. 7, a ½ divider 8 is a circuit for converting a frame pulse train $S_2$ in FIGS. 8A to 8D (The pulse train $S_1$ in FIGS. 8A to 8D shows the input PCM-TDM signal in FIG. 7, sign bits being marked by circles, frame synchronization bits being marked by squares) into a pulse train $S_3$ of alternate frames. The frame pulse train S2 is obtained by known circuitry (not shown) to synchronize with the frame period of the PCM-TDM signal S1. A gate pulse generator 9 is a circuit which, when supplied with the pulse $S_3$, generates pulses $S_4$ in synchronism with the sign bits of the channels 1, 3, 5 . . . during only one frame. Reference numeral 10 indicates an inverter. Further, a switch SW is normally held at the side A in FIG. 7 and an input signal becomes an output as it is but when the pulse $S_4$ is applied, the switch SW is turned to the side B to reverse only the sign bit of the input signal. Accordingly, the sign bits of the channels, 1, 3, 5 . . . are reversed every other frame as indicated by a pulse train $S_5$.

The foregoing description has been given in connection with the case where the sign bits of the channels 1, 3, 5 . . . are reversed but this corresponds to the case where the upper limit $f_0$ of the frequency band of the SSB-FDM signal shown in FIG. 2 is an odd multiple of 4KHz. Generally speaking, the above-mentioned upper limit $f_0$ may be either one of odd and even multiples of 4KHz. In the case of an odd multiple, the polarity bits of the PCM signals of such odd channels as 1, 3, 5 . . . are reversed by the aforementioned sign bit inverter 7 every other frame but the PCM signals of such even channels as 2, 4, 6 . . . are not ever changed. On the other hand, if the upper limit $f_0$ is an even multiple of 4KHz, the PCM signals of the odd channels (the channels 1, 3, 5 . . .) are not changed but the sign bits of the PCM signals of the even channels (the channels 2, 4, 6 . . .) are reversed every other frame. The sign bit inverter 7 is required to perform such a function as described above. This circuit can be constructed by replacing the gate pulse generator 9 in FIG. 7 by a circuit which generates bits at instants in synchronism with the sign bits of the channels 2, 4, 6 . . . . Thus, in this invention, the upper limit $f_0$ of the SSB-FDM signal is a multiple of 4KHz.

Figure 10:
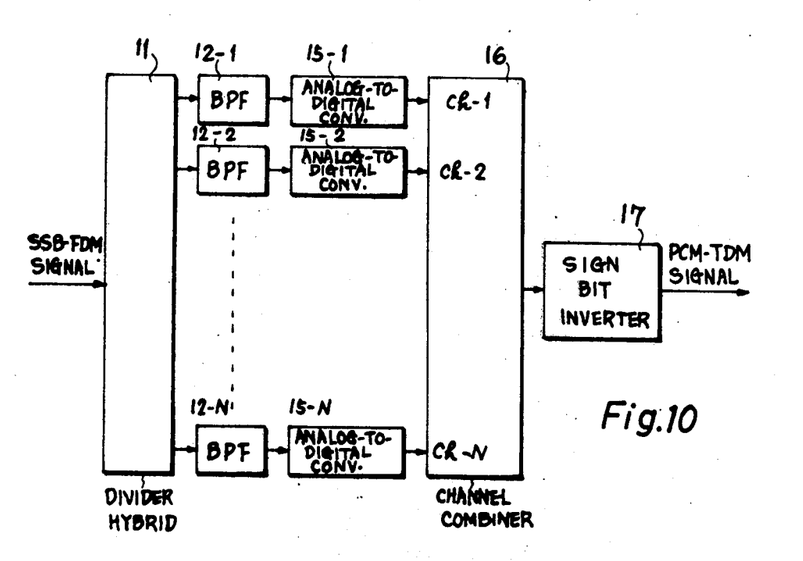
FIG. 10 is a block diagram illustrating another embodiment of this invention.

With reference to FIG. 10, another embodiment of this invention for converting SSB-FDM signals into PCM-TDM signals will be described. In FIG. 10, reference numeral 11 indicates a divider hybrid; 12-1 to 12-N designate N band-pass filters respectively corresponding to the frequency bands of the channels in the FDM signal; 15-1 to 15-N denote N analog-to-digital converters of the same characteristic for converting output analog signals of the band-pass filters 12-1 to 12-N into pulse amplitude modulated signals (hereinafter referred to as PAM) and further converting them into PCM signals; and 16 shows a channel combiner for combining the PCM signals of the respective channels to independently provide frames and transmitting the PCM-TDM signal.

As is evident from FIG. 10, in this invention, the low-pass filters and the frequency converters required in the conventional art are removed and a sign bit inverter 17 is provided for reversing the sign bits of the PCM signals of predetermined specific channels (for example, odd ones) every other frame as shown in FIG. 4(b).

With reference to FIG. 10, a description will be made of the operation of this invention in a case of converting the SSB-FDM signal into the PCM-TDM signal. At first, such an input SSB-FDM signal as depicted in FIG. 2 is separated by the divider hybrid 1 and then SSB signals of respective channels are extracted by the band-pass filters 12-1 to 12-N. These signals of the respective channels are converted by the analog-to-digital converters 15-1 to 15-N into PCM signals and then the PCM signals of the respective channels are combined together by the channel combiner 16 into a PCM-TDM signal shown in FIG. 1. Further, this signal is transmitted over the transmission line after applied to the sign bit inverter 17.

Figure 11A:
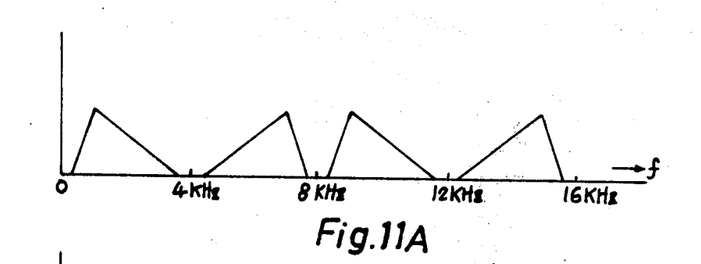
FIGS. 11A and 11B are frequency allocation charts explanatory of the operation of the embodiment shown in FIG. 10.
Figure 11B:
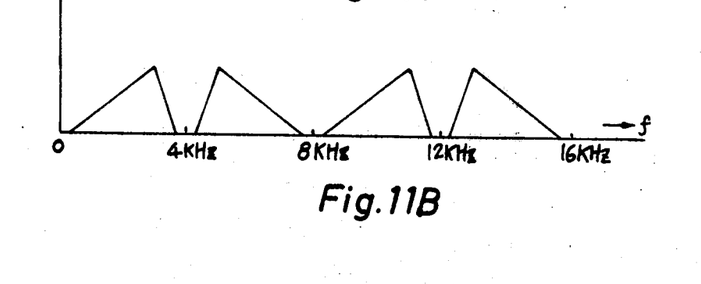

Now, the operation and the function of the sign bit inverter 17 will be described in detail. Generally speaking, the upper limit $f_0$ of the frequency of the SSB-FDM signal in FIG. 2 may be either one of odd and even multiples of 4KHz. If $f_0$ is an odd multiple of 4KHz, the frequency spectrums at the instants when the SSB signals of odd channels such as channels 1, 3, 5 . . . are respectively converted by the analog-to-digital converters 15-1, 15-3, 15-5 . . . into the PAM signals, become such as shown in FIG. 11A. The frequency spectrums at the instants when the SSB signals of even channels such as channels 2, 4, 6 . . . are respectively converted by the analog-to-digital converters 15-2, 15-4, 15-6 . . . into the PAM signals, become such as shown in FIG. 11B.

Figure 12A:
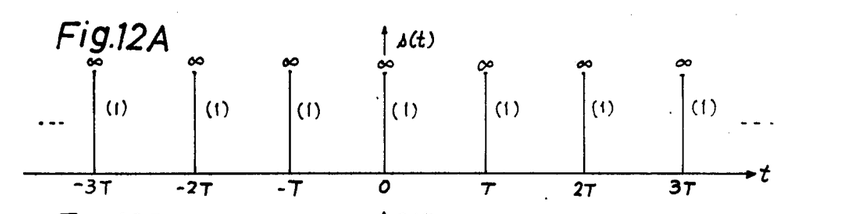
FIGS. 12A, 12B, 12C, 12D, 12E, 12F, 12G and 12F are time charts explanatory of the operation of the embodiment shown in FIG. 10.
Figure 12B:
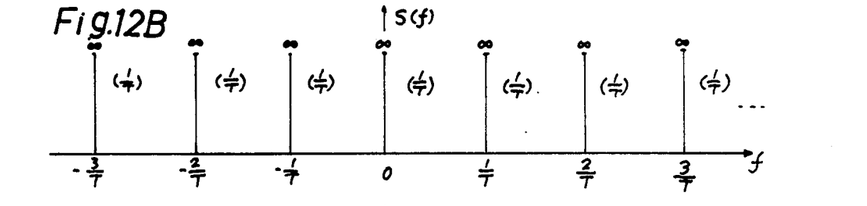
Figure 12C:
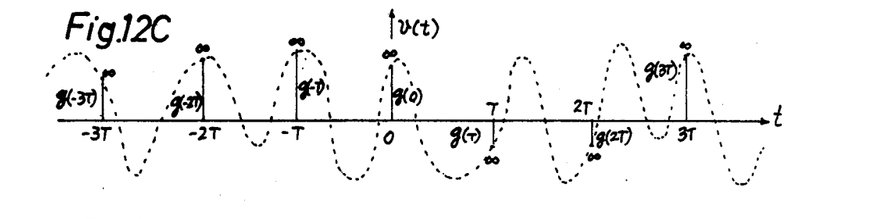
Figure 12D:
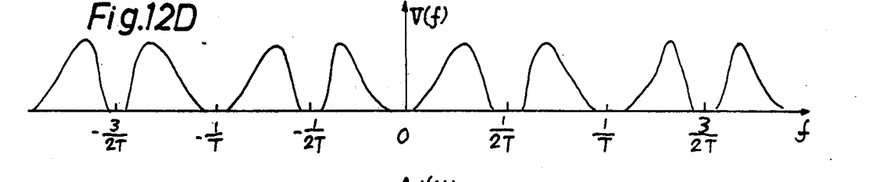
Figure 12E:
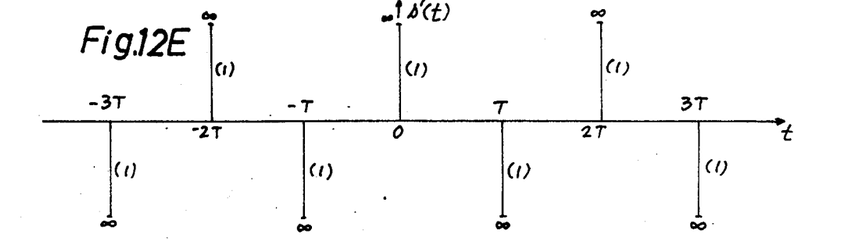
Figure 12F:
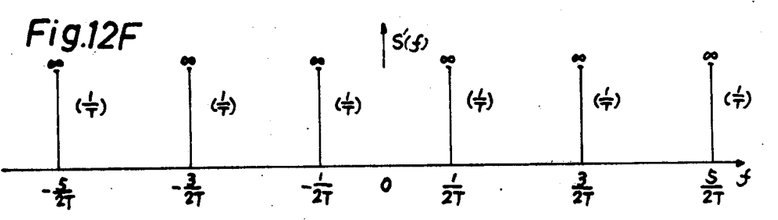
Figure 12G:
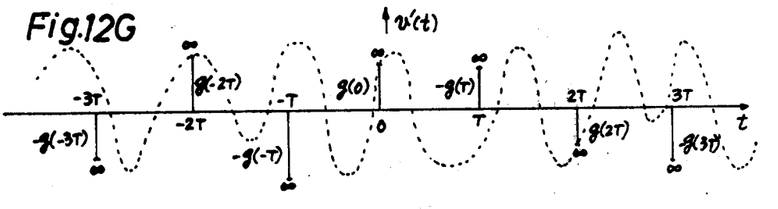
Figure 12H:
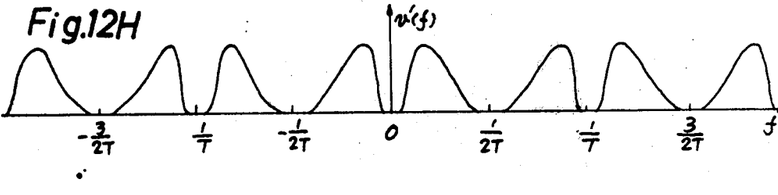

Now, the PAM signal of each channel will hereinbelow be described in detail. Namely, the sampling function $s(t)$ of a uniform impulse train having a period T (usually $T = 125\mu S$ because of 125$\mu$S/frame as described previously) such as shown in FIG. 12A is expressed by $$s(t) = \sum_{k = -\infty}^{\infty} \delta(t - kT),$$

where $k$ is an integer and $\delta$ is an impulse function. The frequency spectrum $S(f)$ of the sampling function $s(t)$ is as follows:

$$S(f) = \frac{1}{T} \sum_{k = -\infty}^{\infty} \delta(f - \frac{k}{T})$$

as shown in FIG. 12B. Further, if the waveform function of the SSB signal is taken as $g(t)$ and if the waveform function sampled by the sampling function $s(t)$ is taken as $v(t)$, it follows that $$v(t) = g(t)s(t) = \sum_{k = -\infty}^{\infty} g(kT)\delta(t - kT)$$

as depicted in FIG. 12C. The frequency spectrum $V(f)$ of $v(t)$ is given by $$V(f) = G(f) \otimes S(f) = \frac{1}{T} \sum_{k = -\infty}^{\infty} G(f - \frac{k}{T}),$$

using the frequency spectrum $G(f)$ of $g(t)$, as shown in FIG. 12D, where $\otimes$ indicates the convolution. That is, as described previously, the frequency spectrum of the PAM signal of each odd channel becomes such as shown in FIG. 11A and the frequency spectrum of the PAM signal of each even channel becomes such as shown in FIG. 11B. In this case, the frequency spectrum in the voice frequency band in FIG. 11B is in its normal state but the frequency spectrum in the voice frequency band in FIG. 11A is in its inverted state. Accordingly, in connection with the odd channels such as the channels 1, 3, 5 . . . in which the frequency spectrum of FIG. 11A is provided, an operation for returning the frequency spectrum to its normal state is necessary. This can be achieved by the sign bit inverter 17. That is, since the reversal of the sign bits every other frame is equivalent to the selection of the sampling function to such as shown in FIG. 12E, its waveform function $s'(t)$ and frequency spectrum $S'(f)$ respectively become as follows:

$$s'(t) = \sum_{k = -\infty}^{\infty} \delta(t - kT)e^{j\pi k}$$

$$S'(f) = \frac{1}{T} \sum_{k = -\infty}^{\infty} \delta(f - \frac{k + \frac{1}{2}}{T})$$

as depicted in FIGS. 12E and 12F. With the waveform function $s'(t)$, a sampled waveform function $v'(t)$ and its frequency spectrum $V'(f)$ are respectively given by $$v'(t) = g(t)s'(t) = \sum_{k = -\infty}^{\infty} g(kT) \delta(t - kT)e^{j\pi k}$$

$$V'(f) = G(f) \otimes S'(f) = \frac{1}{T} \sum_{k = -\infty}^{\infty} G(f - \frac{K + \frac{1}{2}}{T})$$

as shown in FIGS. 12G and 12H. Accordingly, the inversion of the polarity bits every other frame such as depicted in FIG. 10 leads to changing the frequency allocation of FIG. 12D to that of FIG. 12H.

Figure 13:
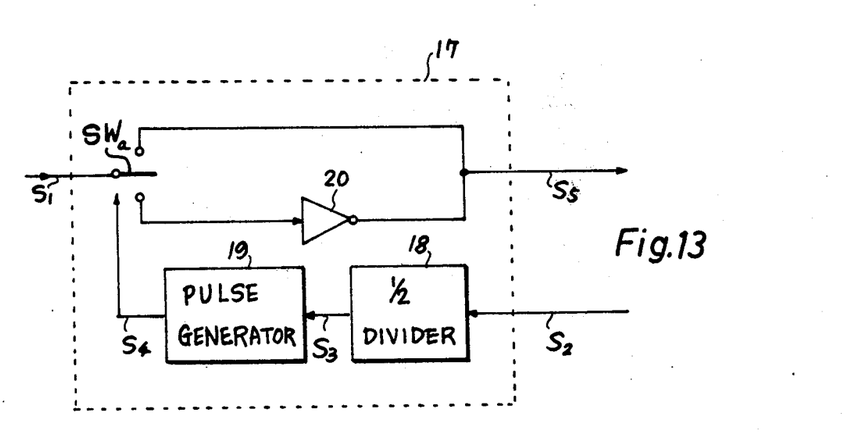
FIG. 13 is a block diagram illustrating an example of a sign bit inverter employed in the embodiment shown in FIG. 10.

Referring next to FIGS. 13 and 8A to 8D, a circuit construction of the sign bit inverter 17 in FIG. 10 will be described. FIG. 13 illustrates one example of the construction of the sign bit inverter 17. In FIG. 13, a ½ divider 18 is a circuit for converting a frame pulse train $S_2$ in FIG. 8 (Each pulse train $S_1$ in each of FIGS. 8A, 8B, 8C and 8D shows the input PCM-TDM signal in FIG. 13, sign being marked by circles, frame synchronization bits marked by squares, the pulse train $S_2$ being synchronized with the pulse train $S_1$.) into a pulse train $S_3$ of alternate frames. A gate pulse generator 19 comprises, for example, a counter and a logic circuit for controlling the counter and, when supplied with the pulse $S_3$, generates pulses in synchronixm with the sign bits of the channels 1, 3, 5 . . . during only one frame. Reference numeral 20 designates an inverter. Further, a switch SW$a$ is normally held at the side A in FIG. 13 and an input signal becomes an output signal as it is but when the pulse $S_4$ is applied, the switch SW$a$ is turned to the side B to reverse only the sign bit of the input signal. Accordingly, the sign bits of the channels 1, 3, 5 . . . are reversed every other frame as indicated by a pulse train $S_5$. On the other hand, in a case where $f_0$ is an even multiple of 4KHz, the frequency spectrum of the PAM signal of each of the odd channels such as the channels 1, 3, 5 . . . in the voice frequency band is in its normal state and the frequency spectrum of the PAM signal of each of the even channels such as the even channels 2, 4, 6 . . . is in its inverted state. Accordingly, it is necessary to provide such a sign bit inverter by which the sign bits of the PCM signals of only the even channels (the channels 2, 4, 6 . . . are inverted every other frame. This circuit 17 can be obtained by replacing the gate signal generator 19 shown in FIG. 13 with a circuit which generates pulses at instants corresponding to the sign bits of the channels 2, 4, 6 . . . Thus, in this invention, the upper limit $f_0$ of the frequency of the SSB-FDM signal becomes a multiple of 4KHz.

As has been described in detail in the foregoing, this invention has such advantage that the use of many low-pass filters and frequency modulators can be avoided by providing, at the stage preceding the analog-to-digital converter 1 or following the channel combiner 16, the sign bit inverter 7 or 17 for inverting the sign bits every other frame, and if the upper limit of the frequency band of the SSB-FDM signal is a multiple of 4KHz, conversion to the PCM-TDM signal is made possible. The effect of this invention has good merits in a system of converting a multiplex signal having a large number of channels and this invention provides a simple and inexpensive transmultiplexer, as compared with conventional circuit construction.

What we claim is:
1. A transmultiplexer comprising:
input terminal means receptive of a pulse-code-modulated, time-division multiplex signal,
a sign bit inverter connected to said input terminal means for reversing sign bits of predetermined specific channels in the pulse-code-modulated, time-division multiplex signal,
a digital-to-analog converter connected to the output of said sign bit converter,
a channel separator connected to the output of said digital-to-analog converter for branching the output signal of said digital-to-analog converter into a plurality of separated signals,
a plurality of band-pass filters connected to said channel separator for providing respective channel signals of a single-side-band frequency-divided multiplex signal, said
a combiner hybrid connected to said band-pass filters to obtain said single-side-band frequency-divided multiplex signal.

2. A transmultiplexer according to claim 1, in which said sign bit inverter comprises first terminal means for receiving said pulse code modulated time division multiplex signal, second terminal means for receiving a frame pulse train of said pulse code modulated time division multiplex signal, third terminal means for sending out an output pulse train, an inverter having an input terminal connected to said first terminal means, a ½ divider connected to said second terminal means for counting down said pulse train to provide a counted-down pulse train, a pulse generator receptive of said counted-down pulse train for generating gate pulses in synchronism with said counted-down pulse train, switch means for switching the input and output of said inverter under control of said gate pulses to provide said output pulse train.

3. A transmultiplexer comprising:
input terminal means receptive of a single-side-band frequency-divided multiplex signal;
a divider hybrid connected to said input terminal means for branching said single-side-band frequency-divided multiplex signal into a plurality of divided signals;
a plurality of band-pass filters connected to said divider hybrid for providing respective channel signals of said single-side-band frequency-divided multiplex signal from said divided signals;
a plurality of analog-to-digital converters respectively connected to said band-pass filters to respectively convert the respective channel signals of said single-side-band frequency-divided multiplex signal to a plurality of pulse-code-modulated pulse trains;
a channel combiner connected to said analog-to-digital converters to provide a combined pulse-code-modulated pulse train from said pulse-code-modulated pulse trains, and
a sign bit inverter connected to the output of said channel combiner for reversing sign bits of predetermined specific channels in said combined pulse-code-modulated pulse train to provide a pulse-code-modulated, time-division multiplex signal.

4. A transmultiplexer according to claim 3, characterized in that said sign bit inverter comprises first terminal means for receiving said combined pulse code modulated pulse train, second terminal means for receiving a frame pulse train of said pulse code modulated time division multiplex signal, third terminal means for sending out an output pulse train as said pulse code modulated time division multiplex signal, a ½ divider connected to said second terminal means for counting down said frame pulse train to provide a counted-down pulse train, a pulse generator receptive of said counted-down pulse train for generating gate pulses in synchronism with said counted-down pulse train, switch means for switching under control of said gate pulses said pulse code modulated time division multiplex signal to provide a first switched pulse train and a second switched pulse train, an inverter provided to reverse the polarity of pulses of said second pulse train, means receptive of said first switched pulse train and the output of said inverter to provide said output pulse train by combining said first switching pulse train with the output of said inverter.

* * * * *